United States Patent
Al-Mahshi et al.

(10) Patent No.: US 10,458,499 B2
(45) Date of Patent: Oct. 29, 2019

(54) MULTI-CALIPER BRAKE ASSEMBLY PER ROTOR

(71) Applicant: AKEBONO BRAKE INDUSTRY CO., LTD, Chuo-ku, Tokyo (JP)

(72) Inventors: Waleed Mahmoud Al-Mahshi, Farmington Hills, MI (US); Gang Lou, Rochester, MI (US); Michio Suzuki, Walled Lake, MI (US)

(73) Assignee: Akebono Brake Industry Co., Ltd., Chuo-ku, Tokyo (JP)

(*) Notice: Subject to any disclaimer, the term of this patent is extended or adjusted under 35 U.S.C. 154(b) by 0 days.

(21) Appl. No.: 15/789,468

(22) Filed: Oct. 20, 2017

(65) Prior Publication Data
US 2019/0120310 A1     Apr. 25, 2019

(51) Int. Cl.
*F16D 55/00*     (2006.01)
*F16D 55/22*     (2006.01)
(Continued)

(52) U.S. Cl.
CPC ............. *F16D 65/18* (2013.01); *F16D 55/22* (2013.01); *F16D 65/0075* (2013.01); *F16D 65/183* (2013.01); *F16D 2055/0045* (2013.01); *F16D 2055/0075* (2013.01); *F16D 2121/04* (2013.01); *F16D 2121/24* (2013.01);
(Continued)

(58) Field of Classification Search
CPC ........ B60T 13/741; B60T 13/746; B60T 8/00; B60T 1/065; B64C 25/44; F16D 65/18; F16D 65/28; F16D 65/183; F16D 2055/0091; F16D 2121/24; F16D 2123/00; F16D 2125/40; F16D 2125/48; F16D 55/22655; F16D 55/227; F16D 55/228; F16D 2055/0008; F16D 2121/14; F16D 2125/32
USPC .............. 303/20; 188/72.1, 72.3, 72.7, 72.8, 188/1.11 E, 1.11 R, 152, 156, 158, 162,
(Continued)

(56) References Cited

U.S. PATENT DOCUMENTS

| 4,804,073 A | 2/1989 | Taig et al. |
| 4,809,824 A | 3/1989 | Bendix |

(Continued)

FOREIGN PATENT DOCUMENTS

| EP | 1607297 A1 | 12/2005 |
| JP | 2009052682 A | 3/2009 |

(Continued)

OTHER PUBLICATIONS

Copending U.S. Appl. No. 62/550,043, filed Aug. 25, 2017.

*Primary Examiner* — Robert A. Siconolfi
*Assistant Examiner* — San M Aung
(74) *Attorney, Agent, or Firm* — The Dobrusin Law Firm, P.C.

(57) ABSTRACT

A brake system comprising: (a) a rotor; and (b) two or more brake assemblies in communication with the rotor, the two or more brake assemblies each including: (i) a caliper; (ii) a piston assembly located within the caliper; and (iii) a motor gear unit in communication with the caliper and configured to move the piston assembly to create a braking force; wherein one or more both of the piston assemblies are moved during a service brake apply or release; and wherein one or both of the piston assemblies are moved during a parking brake apply or release.

20 Claims, 6 Drawing Sheets

(51) Int. Cl.
*F16D 65/00* (2006.01)
*F16D 65/18* (2006.01)
*F16D 121/04* (2012.01)
*F16D 121/24* (2012.01)
*F16D 125/06* (2012.01)
*F16D 125/36* (2012.01)
*F16D 125/40* (2012.01)

(52) U.S. Cl.
CPC ...... *F16D 2125/06* (2013.01); *F16D 2125/36* (2013.01); *F16D 2125/40* (2013.01)

(58) Field of Classification Search
USPC ....... 188/71.1, 71.4, 72.4, 72.6, 73.2, 73.39, 188/73.31, 73.46, 16 F
See application file for complete search history.

(56) References Cited

U.S. PATENT DOCUMENTS

| | | | |
|---|---|---|---|
| 4,865,162 A * | 9/1989 | Morris | B60T 1/065 |
| | | | 188/72.8 |
| 4,995,483 A * | 2/1991 | Moseley | B60T 8/325 |
| | | | 188/162 |
| 5,090,518 A * | 2/1992 | Schenk | B60T 8/00 |
| | | | 188/157 |
| 5,148,894 A | 9/1992 | Eddy, Jr. | |
| 5,168,963 A | 12/1992 | Poncini | |
| 5,348,123 A | 9/1994 | Takahashi et al. | |
| 5,769,189 A | 6/1998 | Heibel et al. | |
| 6,098,763 A | 8/2000 | Holding | |
| 6,139,460 A | 10/2000 | Drennen et al. | |
| 6,173,820 B1 | 1/2001 | Blosch et al. | |
| 6,179,097 B1 | 1/2001 | Schumann | |
| 6,189,661 B1 | 2/2001 | Schaffer | |
| 6,279,690 B1 | 8/2001 | Schaffer | |
| 6,279,691 B1 | 8/2001 | Takahashi et al. | |
| 6,315,092 B1 | 11/2001 | Schwarz | |
| 6,367,593 B1 | 4/2002 | Siler et al. | |
| 6,390,247 B1 | 5/2002 | Drennen | |
| 6,401,879 B1 | 6/2002 | Drennen et al. | |
| 6,412,610 B1 | 7/2002 | Drennen et al. | |
| 6,435,320 B1 | 8/2002 | Drennen et al. | |
| 6,450,586 B1 | 9/2002 | Nagano | |
| 6,488,132 B2 | 12/2002 | Matsuishi | |
| 6,554,109 B1 | 4/2003 | Olschewski et al. | |
| 6,561,321 B1 | 5/2003 | Klode et al. | |
| 6,626,270 B2 | 9/2003 | Drennen et al. | |
| 6,761,252 B1 * | 7/2004 | Weiler | B60T 13/741 |
| | | | 188/71.8 |
| 6,889,800 B2 | 5/2005 | Halasy-Wimmer et al. | |
| 6,915,883 B2 | 7/2005 | Watanabe et al. | |
| 7,188,710 B2 | 3/2007 | Reuter et al. | |
| 7,490,703 B2 | 2/2009 | Maehara | |
| 7,721,853 B2 | 5/2010 | Chittka | |
| 7,942,247 B2 | 5/2011 | Adachi et al. | |
| 2002/0007989 A1 * | 1/2002 | Matsuishi | B60T 1/065 |
| | | | 188/73.39 |
| 2003/0042084 A1 | 3/2003 | Kawase et al. | |
| 2003/0050147 A1 * | 3/2003 | Backes | F16D 65/18 |
| | | | 475/343 |
| 2004/0159509 A1 | 8/2004 | Chang et al. | |
| 2004/0231946 A1 * | 11/2004 | Neelakantan | F16D 23/12 |
| | | | 192/84.6 |
| 2006/0124406 A1 | 6/2006 | Baumgartner | |
| 2007/0062764 A1 * | 3/2007 | Takahashi | B60T 13/746 |
| | | | 188/1.11 E |
| 2007/0187192 A1 * | 8/2007 | Anderson | B60T 13/741 |
| | | | 188/158 |
| 2008/0283345 A1 * | 11/2008 | Balz | F16D 65/18 |
| | | | 188/72.6 |
| 2009/0026024 A1 | 1/2009 | Baldeosingh et al. | |
| 2009/0223752 A1 * | 9/2009 | Kim | B60T 13/741 |
| | | | 188/72.1 |
| 2011/0162935 A1 * | 7/2011 | Winkler | F16H 25/2238 |
| | | | 192/219.4 |
| 2013/0341134 A1 * | 12/2013 | Chico | F16D 65/28 |
| | | | 188/158 |
| 2017/0152027 A1 * | 6/2017 | Onfroy | B60T 13/741 |

FOREIGN PATENT DOCUMENTS

| | | |
|---|---|---|
| WO | 2000/037819 A1 | 6/2000 |
| WO | 2013/121395 A1 | 8/2013 |
| WO | 2016/015274 A1 | 2/2016 |
| WO | 2016/064980 A1 | 4/2016 |
| WO | 2019/002916 A1 | 6/2017 |

* cited by examiner

MULTI-CALIPER BRAKE ASSEMBLY PER ROTOR

FIELD

The present teachings relate to a brake system that includes two brake assemblies per rotor and preferably two calipers per rotor for the rear corners of a vehicle.

BACKGROUND

The present teachings are predicated upon providing an improved parking brake for use in an existing disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, or the like. However, the present teachings are most suitable for use with a passenger vehicle (e.g., a car, truck, sports utility vehicle, or the like).

Generally, a braking system includes a rotor, a caliper body, a support bracket, an inboard brake pad, and an outboard brake pad that are on opposing sides of the rotor. The caliper body further includes one or more fingers (with or without a piston), one or more piston bores, and a bridge that connects the one or more fingers to the piston bores or two opposing piston bores together. The piston bores each house a piston. The piston bores each have a bore axis that the pistons move along during a brake apply and a brake retract. The piston bores each include a fluid inlet, a closed wall, a front opening, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston axially towards the front opening and into contact with a brake pad that generally includes a pressure plate and friction material and the friction material will contact the rotor on one side and an opposing brake pad will contact the rotor on an opposing side creating friction to stop rotation of the rotor and any component connected to the brake system. The brake pads may slide on an abutment along an axis of the pistons or the brake pads may include holes that receive pins and the brake pads may slide on pins that extend through the brake system so that a friction force may be created.

However, the braking system may be used in non-braking conditions when the vehicle is parked so that movement of the vehicle is prevented. The parking brake may be a discrete braking system or may use one or more components of a primary braking system. Parking brake systems typically include one or more brake pads and/or brake shoes that may be moved to create a parking force so that the vehicle is restrained during non-movement of a vehicle. These parking brake systems may be actuated by a cable that when moved biases a device that simultaneously actuates the brake pads and/or brake shoes to generate the parking force. More recently, there have been attempts to create a braking system that performs both the service braking and the parking braking.

Examples of braking systems and associated parking brake systems are disclosed in U.S. Pat. Nos. 5,090,518; 5,168,963; 6,450,586; and 6,488,132 and U.S. International Application Publication No. WO2016/015247 and WO2016/064980 all of which are expressly incorporated herein by reference for all purposes. It would be attractive to have a parking brake system that includes multiple discrete hydro-electrically actuated pistons that are simple in design and are capable of operating independently. It would be attractive to have a multiple piston corner module with the multiple pistons being part of separate brake assemblies (systems). What is needed is a process of controlling a plurality of discrete braking assemblies to coordinate and work together to create a service brake function, a parking brake function, or both. What is needed is multiple high efficiency brake assemblies that distribute work so that braking is performed without the need for a multiple piston caliper assembly. It would be attractive to have a multiple caliper system that work independently but cooperate with each other.

SUMMARY

The present teachings provide: a brake system comprising: (a) a rotor; and (b) two or more brake assemblies in communication with the rotor, the two or more brake assemblies each including: (i) a caliper; (ii) a piston assembly located within the caliper; and (iii) a motor gear unit in communication with the caliper and configured to move the piston assembly to create a braking force; wherein one or more both of the piston assemblies are moved during a service brake apply or release; and wherein one or both of the piston assemblies are moved during a parking brake apply or release.

The present teachings include: a method comprising: (a) supplying a signal to both a first brake assembly and a second brake assembly simultaneously; (b) alternating the signal between the first brake assembly and the second brake assembly once contact between the first brake assembly and a rotor or the second brake assembly and the rotor is detected; and (c) moving the first brake assembly and the second brake assembly until a predetermined braking force is generated or released.

The present teachings provide a parking brake system that includes multiple discrete hydro-electrically actuated pistons that are simple in design and are capable of operating independently. The present teachings provide a multiple piston corner module with the multiple pistons being part of separate brake assemblies (systems). The present teachings provide a process of controlling a plurality of discrete braking assemblies to coordinate and work together to create a service brake function, a parking brake function, or both. The present teachings provide multiple high efficiency brake assemblies that distribute work so that braking is performed without the need for a multiple piston caliper assembly. The present teachings provide a multiple caliper system that work independently but cooperate with each other.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein provide a brake system. The brake system may function to provide a friction force such as a braking force, a parking brake force, a stopping force, or a combination thereof. The brake system may be a combination of all of the braking elements located in a corner of a vehicle. The brake system may be two or more brake assemblies, a rotor, brake pads, calipers, or a combination thereof. Preferably, the brake system is two brake assemblies that share a common rotor. The brake system may create a braking force, which is a force that stops rotation of a rotor, stops movement of a vehicle, or both. The brake system may create a parking force, which is a force that prevents rotation of a rotor, movement of the vehicle, or both when the vehicle is in a stopped position or in an emergency situation. The brake system may be a pneumatic brake system, an electrical brake system, a hydraulic brake system, or a combination thereof. Preferably, the brake system is a combination hydraulic system and electric system. More preferably, the brake system is hydraulic in one phase and electric in a different phase. The electric brake system may use one or more electric motors to actuate the brake pads. For example, the hydraulic brake system may actuate the brake pads during a standard braking operation and the electric brake system may actuate the brakes upon parking and/or maintaining the brake system in a stopped configuration. The brake system may be an opposing brake system (i.e., a fixed caliper brake system) or a floating brake system (i.e., a floating caliper). The brake system may move the same piston and the same brake pads in the electric phase as are moved in the hydraulic phase. The brake system may include one or more brake pads, one or more pistons, one or more rotors, one or more brake assemblies, or a combination thereof. Preferably, each brake system includes one piston and one electric motor that electrically actuates the piston. Each brake system may include multiple pistons or two opposed pistons that are actuated by a single motor. More preferably, the corner module includes two or more brake systems and a rotor that are located inside of a rim. Most preferably, two single piston brake assemblies are located within a rim in two or more corners of a vehicle (e.g., the rear tires).

The rim may function to support a tire, a rotor, the brake system, a brake assembly, or a combination thereof. The rim may surround all or a portion of one or more brake assemblies. Preferably, two or more brake systems are located within a rim of a corner module (e.g., a quadrant of a vehicle where a tire meets the ground). The rim may house the rim and a plurality of brake systems.

The one or more brake assemblies function to move one or more brake pads into contact with a rotor to create a parking brake apply, a stopping brake apply, release a brake apply, or a combination thereof. The one or more brake assemblies may include a caliper, brake pads, support bracket, one or more pistons, one or more motor gear units, or a combination thereof. Preferably, each brake assembly includes a single piston and a single motor gear unit. More preferably, each brake assembly works in conjunction with another brake assembly to stop motion of a vehicle, prevent motion of a vehicle, or both. The one or more brake assemblies may individually each create a braking force. Each brake assembly may individually stop a vehicle or prevent motion of a vehicle. Preferably, the brake system includes two or more brake assemblies. Each of the brake assemblies may be in communication with a rotor. Preferably, each of the brake assemblies are in communication with the same rotor of the brake system. The brake assemblies may be located side by side. The brake assemblies may be separated by an angle. The angle may be about 180 degrees or less, about 165 degrees or less, about 145 degrees or less, about 125 degrees or less, about 105 degrees or less, about 90 degrees or less, or about 60 degrees or less. The angle between the brake assemblies may be about 15 degrees or more, about 30 degrees or more, or about 45 degrees or more. The angle between the brake assemblies may be measured through a center of the piston bore. The brake assemblies may be located so that the motor gear units may face each other and control circuitry (e.g., wiring) may be split and applied to each. The brake assemblies may be located so that the motor gear units may face away from each other. The brake assemblies may be located so that the motor gear units may face in the same direction. When more than one brake assembly is used each brake assembly may individually move one or more brake pads to create a braking force.

The one or more brake pads may function to create a friction force (e.g., a stopping force, a parking force, a braking force, or a combination thereof) when moved into contact with another member (e.g., a rotor, drum, or the like). The one or more brake pads may include one or more portions that assist in creating a friction force. The one or more brake pads may include a pressure plate and friction material. The one or more brake pads may be opposing brake pads. The one or more brake pads may contact opposing sides of the member (i.e., body assembly) during a friction force. For example, the brake pads may contact opposing pistons, or two or more adjacent pistons and one or more opposing fingers. All or a portion of the brake pads may be moved to create a parking brake force. For example, if there are multiple pistons on each side of the body assembly, rotor, or both a single piston on each side of the rotor may be actuated pushing a portion of the brake pad into contact with the rotor so that a parking brake force is created. The one or more brake pads may be moved into contact with a rotor by a piston, fingers, or a combination of both.

The rotor may function to assist in creating a friction force. The rotor may extend between two or more opposing brake pads so that one or more brake pads contact each side of the rotor to create a friction force. The rotor rotates around an axis of rotation for the brake system. The rotor may be generally circular and may extend through a body assembly, be connected to a body assembly, be partially surrounded by a body assembly, or a combination thereof. Preferably, the rotor extends through the one or more brake assemblies (e.g., a caliper) so that an inboard brake pad extends along an inboard face of the rotor and an outboard brake pad extends along an outboard face of the rotor. As the rotor is slowed by the one or more brake assemblies the rotor stops a corresponding tire of a vehicle. The brake pads may be moved into contact with the rotor by one or more pistons in a caliper moving into contact with the respective brake pads or a piston contacting one brake pad and fingers of a caliper moving into contact with an opposing brake pad.

The caliper (e.g., body assembly) may function to move two or more brake pads into contact with a rotor to create a friction force. The caliper may move during a brake apply or release (i.e., be a floating caliper). The caliper may be fixed so that a body of the body assembly does not move to create a friction force (i.e., a fixed caliper). The caliper may be connected to two or more opposing surfaces, pins, or both and may slide upon the two or more opposing surfaces, pins, or both so that a friction force is created. The caliper may be connected to a knuckle vie one or more guide pins. The caliper may move along the one or more guide pins. The caliper may be static relative to the one or more guide pins. The caliper may be directly connected to a knuckle or support structure. The caliper may include an inboard side and an outboard side that are connected by a bridge extending there between. The inboard side, outboard side, or both may include one or more of the following: one or more pistons, one or more fingers, two or more pistons, or two or more fingers. The inboard side may be located on an inside of a body of a vehicle and be free of exposure to an area around a vehicle and an outboard side may face an area on an outside of a vehicle. The caliper may be movable connected to a support bracket.

The support bracket may function to connect a caliper to a vehicle. The support bracket may be grounded and a caliper may move relative to the support bracket. The support bracket may include one or more pins or bolts and the caliper may move along the pins or bolts. The support bracket may be directly connect to the caliper. The support bracket may carry the brake pads. The support bracket may include pins or bolts that carry the brake pads. The support bracket may assist in carrying a motor gear unit (MGU). The support bracket may be free of contact with a motor gear unit. The brake assembly may be free of a support bracket. The support bracket may be connected to the knuckle via one or more bolts. A single support bracket may carry two or more calipers. A single support bracket may connect to the knuckle and each of the calipers may connect to the support bracket. The support bracket may be connected to the caliper via one or more bolts. The one or more bolts may include a boot. The boot may be a dust boot. The boot may retain lubrication. The boot may move with the caliper, along a pin, or both as the caliper is moved by one or more pistons extending in and out of the one or more piston assemblies.

The one or more piston assemblies (e.g., piston, piston bore, spindle, nut, rolling elements, rotary to linear actuator, or a combination thereof) may function to move one or more brake pads, create a friction force, or both. All or a portion of the one or more piston assemblies may function to move forward and backward along an axis (i.e., axially in and out of the piston bores) so that one or more brake pads create a friction force and are released from creating a friction force. A portion of the one or more piston assemblies may be moved hydraulically, pneumatically, electrically, or a combination thereof to create a brake apply, a parking brake apply, a brake release, or a combination thereof. Preferably, the one or more piston assemblies create a braking force using one method of moving the brake pads and the piston assemblies create a parking force using a different method of moving the brake pads. For example, the braking force may be created by the piston assembly creating a hydraulic force to move the brake pads, and the parking force may be creating by the piston assembly electrically moving the brake pads. The piston assembly may include at least a piston and a piston bore and the piston may extend along an axis of the piston bore.

Each piston bore may function to house one or more pistons, one or more components that move a piston, be all or a portion of a piston assembly, or a combination thereof. Each caliper may include one or more piston bores. Each caliper may include a plurality of piston bores. Preferably, each caliper includes one piston bore. The piston bore may connect a piston assembly to a bridge, a caliper, or both. One or more piston bores may be located on the inboard side, the outboard side, or both of a caliper. Two or more piston bores may be located on the inboard side or the outboard side only of the body assembly. Two or more piston bores may be located on both the inboard side and the outboard side of the body assembly. The piston bore may include a closed side and an open side. The closed side may be walls that are located on the outside of the piston assembly and the open side may be centrally located so that the pistons may be moved from the piston bores towards each other, a brake pad, a rotor, or a combination thereof. The piston bores may be located adjacent, opposed, side by side, or a combination thereof. Each of the piston bores include a piston bore axis. When one or more opposing pistons are used, each of the axes of the piston bores are generally aligned, generally parallel, or both (e.g., ±1°). The one or more piston bores may each include a piston. The one or more components that each piston bore may include are one or more bearings, one or more rolling elements, one or more threaded elements, one or more spindles, one or more nuts, one or more pistons, a fluid, one or more seals, one or more rotary to linear actuators, or a combination thereof.

The one or more pistons may function to move in and out of a piston bore to create a friction force. The one or more pistons may move along an axis, the piston bore axis, or both. The one or more pistons may function to move one or more brake pads. The one or more pistons may assist in sealing the piston bore so that a fluid is trapped within the piston bore, the piston, or both. The one or more pistons may have sufficient strength so that the one or more pistons may be moved by a fluid, moved by air, moved by an electrical device, or a combination thereof to create a friction force. The one or more pistons may assist in sealing the open side of the piston so that a fluid, an actuation device, or both is sealed within the piston bore. The piston may be made of or include metal, aluminum, steel, phenolic, plastic, iron, a cap, or a combination thereof. The actuation device may include one or more components that move the piston. The one or more pistons may include one or more threads, be in direct contact with one or more rolling elements, be directly connected to a spindle via one or more rolling elements, or a combination thereof. The one or more pistons may include an anti-rotation device so that the pistons are free of rotation.

The anti-rotation device may function to prevent the piston from rotating. The anti-rotation may function to permit the rotary to linear actuator to move the piston without the piston rotating. The anti-rotation device may be located between the piston and the piston bore. The anti-rotation device may be part of the piston, the piston bore, or both. The anti-rotation device may prevent rotation during a hydraulic apply, an electric apply, a release, or a combination thereof. The anti-rotation device may extend around an outside of the piston. The anti-rotation device may be an elastomeric piece that extends between the piston and the piston bore to prevent rotation of the piston. The anti-rotation device may be rubber, silicone, metal, plastic, oil resistant, brake fluid resistant, or a combination thereof. Preferably, the anti-rotation device is an O-ring. The anti-rotation device may be a circlip. The anti-rotation device may be a feature formed into an exterior of the piston, an interior of the piston bore, or both. The anti-rotation device may be a feature in a wall (e.g., a flat wall, arcuate wall, flat portion, a projection, a depression, or a combination thereof) so that upon some rotation of the piston the feature in the wall contacts a wall of the piston bore or a piece connected to a wall of the piston bore and further rotation is prevented. The anti-rotation device may be a combination of an elastomeric piece and an exterior wall of the piston. The anti-rotation device may be a combination of a shape in an exterior wall of the piston and a material wrapped around an exterior of the piston. The piston during creation of a friction force may be moved by a fluid, a spindle, ball ramp, rotary to linear actuator, a drive gear, or a combination thereof.

The one or more rotary to linear actuators function to axially move a piston upon rotation. The one or more rotary to linear actuators may be axially static; relative to the piston, the motor, or both, while rotating about an axis. The one or more rotary to linear actuators may expand axially by being rotated. The one or more rotary to linear actuators may include one or more rolling elements and preferably a plurality of rolling elements. The one or more rotary to linear actuators may only rotate during an electric brake apply or release. The one or more rotary to linear actuators may rotate during a hydraulic brake apply or release. The one or more or more rotary to linear actuators may have a rotational piece and a static piece. The one or more rotary to linear actuators may be a spindle and nut, a ball ramp, or both.

A wall of the piston may form one wall or side of a ball ramp. For example, one or more ball bearings may be in direct contact with a wall of the piston. In another example, the ball bearings may be sandwiched between a wall of the piston and a first wall of the ball ramp so that as the wall of the ball ramp rotates the piston is axially moved. The ball ramp may have a first wall and a second wall with a rolling element located between the first wall and the second wall. The first wall, the second wall, or both may be flat. The first wall, the second wall, or both may have a ramped surface so that as the rolling element, the ramped surface, or both are moved the ball ramp axially expands or contracts. The one or more ball ramps may be free of contact with a spindle. The one or more ball ramps may be contacted by a spindle that may rotate the first wall, the second wall, or both. The brake system may be free of ball ramps. The rotary to linear actuators may be a combination of ball ramps, spindles, or both to axially move the one or more pistons during a brake apply, a brake release, a parking brake apply, a parking brake release, or a combination thereof.

The one or more spindles may function to move one or more pistons to create a friction force. The one or more spindles may move along an axis of the spindle, an axis of the piston, an axis of the piston bore, or a combination thereof. The one or more spindles may be any configuration that an electric motor, a hydraulic device, a pneumatic device, a linear actuator, a stepper motor, or a combination thereof may move the spindle along an axis to create a friction force. The one or more spindles may function to contact a rear side of a piston and axially move the piston and an associated brake pad into contact with a rotor, towards an opposing brake pad and/or piston, or both. The one or more spindles may function to be moved in any manner so that the spindles contact a piston and axially move the piston to create a braking force, a parking force, or both. The one or more spindles may include one or more threads that assist in axially moving the spindle. The one or more spindles may include threads that helically wrap around the spindles and axially move the spindles in and out of the piston bore. The threads may be in contact with a nut or a piston and upon rotational movement of the spindle the nut, the piston, or both may axially move relative to the spindle. The spindle may include one or more gears, one or more geared portions, or both on the elongated portion so that the spindle may be axially moved. The one or more spindles may include one or more threads. The one or more thread may be lead thread (e.g., a lead screw). Preferably, the one or more spindles include threads that receive rolling elements so that the spindles are high efficiency spindles (e.g., require a low force to rotate the spindle relative to a nut or piston (i.e., a force that is less than 50% that of a threaded spindle)). The one or more spindles may be made of any material that is resistant to a fluid and in particular brake fluid. The one or more spindles may be made of plastic, a phenolic resin, a metal (e.g., steel, stainless steel, aluminum, or a combination thereof), a polymer, or a combination thereof. The one or more spindles may be substantially solid. Preferably, the one or more spindles may include one or more apertures and preferably a plurality of apertures for a fluid to pass through the spindle and into contact with a back side of the piston so that the fluid moves the piston to create a friction force. The plurality of apertures may be located within a pushing portion. The one or more spindles may include a pushing portion and an elongated portion.

The pushing portion may function to contact the piston and move the piston to a braking position, to create a friction force. The pushing portion may allow fluid to pass through so that a hydraulic braking force may be created. The pushing portion may function to evenly distribute pressure across a face of a piston so that an even distribution of force is applied on the brake pads. The pushing portion may be generally planar. The pushing portion may be porous, include apertures, include through holes, or a combination thereof. The pushing portion may have a hub and spoke configuration. The pushing portion may have a shape that mirrors the shape of the piston. The pushing portion may be substantially perpendicular to the piston bore axis. The pushing portion may be a nut that is in communication with the elongated portion. The pushing portion and the elongated portion may be one part. Preferably, the nut and elongated portion are two pieces that are axially movable separately from each other. The pushing portion may be the piston itself. For example, the brake assembly may be free of a nut and the elongated portion may directly provide a force to the piston so that the piston is axially moved. The pushing portion may be movably connected or rigidly connected to the elongated portion.

The elongated portion may function to move the pushing portion along an axis to move the piston. The pushing portion (e.g., a nut) and the elongated portion (e.g., spindle) may be two separate pieces. When the elongated portion is discrete from the pushing portion the elongated portion may be the spindle. However, if the pushing portion and elongated portion are one piece then together they comprise the spindle. The elongated portion may be in communication with a component that moves the spindle axially (e.g., a nut or in moving communication with the piston). The elongated portion may be threaded, may include one or more axial driving features, steps, ratchet features, apertures, recesses, grooves, grooves with rolling elements, or a combination thereof. The elongated portion may be rotated relative to the pushing portion. Preferably, the elongated portion and the pushing portion may move as one unit. The one or more spindles may be rotated about an axis and as the one or more spindles rotate the spindle may move along an axis. Preferably, the one or more spindles remain substantially rotationally static and the one or more components (e.g., nut or gears) rotate about the spindle to axially advance the spindle. The spindle may rotationally move and the nut, piston, or both may be rotationally static. The elongated portion may be threaded and may be in communication with a nut. The elongated portion (e.g., spindle) may rotate to axially move the nut, the piston, or both and the elongated portion may remain axially static. The elongated portion may be in direct contact with a piston and be free of a nut. The elongated portion may have threads that are in direct contact with threads of a piston. The elongated portion may include grooves that include rolling elements that are in contact with a nut, a piston, or both. The rolling elements may be balls, cylinders, or both. The rolling elements may be low friction rolling elements when compared to a threaded connection. The rolling elements may rotate as the elongated portion rotates but may assist in axially moving the nut, the piston, or both. When rolling elements are present the spindle may be a high efficiency spindle. When threads are present without rolling elements the spindle may be a low efficiency spindle. The spindle may be rotated by a motor, a motor gear unit, a gear assembly, or a combination thereof. The spindle may be in direct contact with a gear assembly of a motor gear unit and the gear assembly may transfer torque from the motor to the spindle.

The gear assembly functions to rotate the spindle. The gear assembly functions to increase torque from the motor, increase rotational speed from the motor, decrease torque, decrease rotational speed from the motor, or a combination thereof. The gear assembly may assist in rotating the spindle so that the piston is axially moved and a braking force is created. The gear assembly may be a planetary gear system, helical gear, belt, chain, a worm gear, a differential, a multi-stage planetary gear system, spur-gear assembly, or a combination thereof. Preferably, the gear assembly includes one or more planet gears, sun gears, cages, or a combination thereof. The gear assembly may include a series of gears that are connected together to rotate the spindle. The gear assembly may increase the speed, torque, or both of the spindle relative to the rotational speed of the motor. The gear ratio of the motor to the spindle may be about 50:1 or more, about 75:1 or more, about 100:1 or more, about 150:1 or more, about 200:1 or more, about 400:1 or more, or about 600:1 or more. The gear ratio of the motor to the spindle may be about 5000:1 or less; about 2500:1 or less; or about 1000:1 or less. For example, for every 100 revolutions of the motor the spindle will rotate 1 times (i.e., 100:1). The gear assembly may include a driven gear, a driving gear, a sun gear, planetary gears, a ring gear, or a combination thereof. The gear assembly may be in direct contact with a motor, a driving gear of the motor, or both.

The motor may function to provide energy to one or more devices so that friction force is generated. The motor may function to directly and/or indirectly move one or more piston assemblies. The motor may function to actuate the one or more brake pads by a hydraulic force, an electric drive, a pneumatic drive, or a combination thereof. Preferably, the motor rotates one or more spindles during an electric brake apply or an electric brake release so that one or more pistons are axially moved. More preferably, each motor may only move one piston. Each motor may rotate and provide torque to a gear assembly and the gear assembly may increase or decrease the torque and move the spindle so that the spindle axially moves a piston to create a brake apply or brake release. Each motor may rotate at a speed so that a gear assembly is rotated and the gear assembly may increase or decrease rotational speed to the spindle so that the spindle axially moves the piston to create a brake apply or brake release. The motor may include or be connected to one or more motor brakes that prevent back drive of the motor when the motor is turned off.

The one or more motor brakes may function to prevent back drive of a piston when a motor is turned off. Each motor gear unit may include one or more motor brakes. Preferably, each motor gear unit includes a motor brake that is in communication with a shaft of the motor. The motor brake may be located to a rear side of the motor that is opposite the drive side of the motor where the motor provides torque to the rotary to linear actuator. The motor brake may be one or more gears. The motor brake may be one or more worm gears. The motor brake may be or include a pawl, a wrap spring, two plates that contact each other, or a combination thereof. The motor brake may create friction so that an amount of force placed on the brake pads cannot back drive the pistons. The motor brakes prevent rotation of a motor shaft so that the rotary to linear actuator remains axially static while the motor is off, the motor brake is on, or both. The motor, motor brake, gear assembly, or a combination thereof may be located in a single package (e.g., a motor gear unit).

The motor gear unit may function to axially move the piston to create a brake apply, maintain a brake apply, brake release, or a combination thereof. The system may include one or more motor gear units. Preferably, each corner or each brake system includes at least two motor gear units (i.e., one for each brake assembly). Each brake assembly may include a motor gear unit. Each motor gear unit may be operated independently of any other motor gear units. Each motor gear unit may be connected to a single brake assembly. Each motor gear unit may move a single piston. Each motor gear unit may be connected to a piston bore of a caliper. Each motor gear unit may be connected to an extend cantilever from a piston bore. The motor gear units may be connected to a knuckle, a caliper, a support bracket, or a combination thereof. The motor gear units may be connected to a control system, a control unit or both. The plurality of motor gear units may be controlled by a control system.

The control system may function to coordinate a brake apply or brake release between one or more brake assemblies and preferably two or more brake assemblies. The control system may control the brake system (e.g. the brake systems in each of the 4 corners on a vehicle). Each corner may include a control system. Each brake system may be controlled individually. All of the brake systems in the corners may be controlled together. The control system may apply two or more brake assemblies simultaneously. The control system may apply or release two brake assemblies, in a corner, in series. The control system may apply or release two brake assemblies, in a corner, in parallel. The control system may apply one brake assembly and then a second brake assembly. The control system may operate one brake assembly and then the second brake assembly. The control system may alternate between two or more brake assemblies. The control system may fully operate one brake assembly and then fully operate a second brake assembly. The control system may operate only one brake assembly per parking brake apply or release and may alternate between the two or more brake assemblies each time a parking brake apply is created or released. The control system may allow a user to select a level of parking brake applied. For example, if the brake system is on a large truck the control system may allow a user to select a no load condition where only one brake assembly is applied and then a high load condition (e.g., a trailer is connected, a storage area is filled, or the vehicle is parked on a hill) so that both brake assemblies are applies. During an electric brake apply, the control unit may determine if a hydraulic assist is needed to complete a brake apply. The control system may monitor current conditions of the brake assemblies to determine if a re-clamp is needed of one or more of the brake assemblies. The control system may determine a temperature of the brake assemblies to determine if a re-clamp is needed. The control system may include one or more control units.

The control units may function to monitor one or more brake assemblies for a current condition, control movement of the one or more brake assemblies, control an amount of pressure created by each of the brake assemblies, or a combination thereof. The control units may be connected to one or more sensors. The control units may monitor current, voltage, or both to determine a position of the brake pads, the piston, the spindle, or a combination thereof. The control unit may be connected to one or more sensors that monitor the brake assemblies. Preferably, the control unit monitors the brake assemblies by monitoring conditions of the motor, energy supplied to the motor, a duration of time, or a combination thereof. The control unit may monitor position of the brake assembly, piston, brake pads, or a combination thereof during a hydraulic brake apply, an electric brake apply, a brake release, or a combination thereof. The control unit may provide feedback to a control system and the control system may decide which control unit, brake assembly, or both to power first. The control unit may be connected to one or more valves. The control unit may control both the hydraulic application of the brakes and the electric application of the brakes. The control unit may turn on or off the hydraulic system of one or both of the brake assemblies based upon a sensed condition, an input condition, or both. For example, the controller may monitor if a trailer is connected and if a trailer is connected both brake assemblies may be hydraulically operated, electrically operated, or both; however, if a trailer is not connected then only one brake assembly may be operated. The control unit may control the hydraulic system by one or more valves.

The one or more valves may function to turn on and off hydraulic fluid to one or more of the piston assemblies. The one or more valves may each connect to a brake assembly. The one or more valves may be a ball valve, gate valve, globe valve, butterfly valve, or a combination thereof. The one or more valves may prevent a hydraulic fluid from extending to the one or more brake assemblies so that a hydraulic brake apply is not created. The hydraulic system may be free of valves.

The hydraulic system functions to move the one or more pistons during a service brake apply. The hydraulic system may generate fluid pressure to move actuate one brake assembly or two or more brake assemblies. The one or more hydraulic systems may move hydraulic fluid to all of the brake assemblies so that all of the brake assemblies are applied simultaneously. The hydraulic system may include one or more hydraulic units that apply hydraulic fluid to the brake assemblies to create a brake apply.

The hydraulic unit function to increase pressure in the hydraulic system to create a braking force. The hydraulic unit may distribute brake fluid to one or more of the brake assemblies. The hydraulic unit may alternate in applying brake fluid to the brake assemblies. Each brake assembly may include its own hydraulic unit.

The brake system may be controlled via a process and the process may perform any of the steps taught herein in virtually any order. The process may include a step of actuating one brake assembly and then actuating a second brake assembly. Both brake assemblies may be actuated at the same time. The brake assemblies may be turned off so that one brake assembly is actuated. The brake assemblies may be electrically, hydraulically, or both turned on an off. The brake assemblies may re-clamp one at a time. The brake assemblies may re-clamp at the same time. The brake assemblies may be monitored by one control unit or multiple control units. The brake assemblies may be controlled independently of one another. The brake assemblies of one wheel may be tied to a brake assembly of another wheel. For example if each wheel includes two brake assemblies then the first assembly of each wheel may be controlled together and the second assembly of each wheel may be controlled together. Thus, if the first assembly is turned off on one side the first assembly is turned off on a second side (or re-clamped, released, clamped, pressure increased, etc. . . . )

Figure 1:
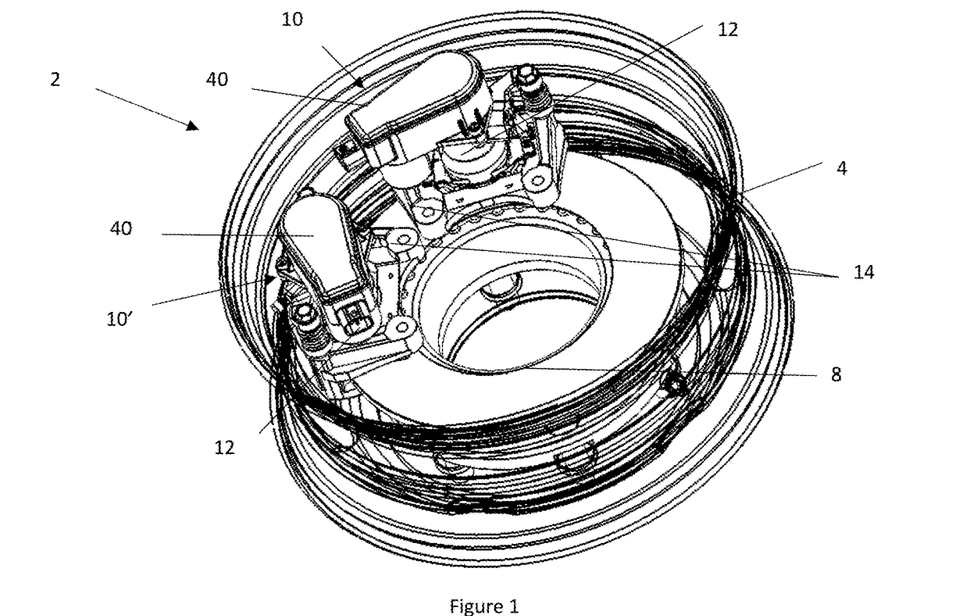
FIG. 1 is a perspective view of a brake system located within a rim.

FIG. 1 is a perspective view of a brake system 2 that includes two brake assemblies 10, 10' located within a rim 4. The brake assemblies 10, 10' are in communication with a rotor 8. Each of the brake assemblies 10, 10' include a caliper 12 and support bracket 14 that the caliper 12 moves along to create a braking force. Each brake assembly 10, 10' includes a motor gear unit 40 that creates or releases a braking force (e.g., parking brake apply, service brake apply, or both).

Figure 2:
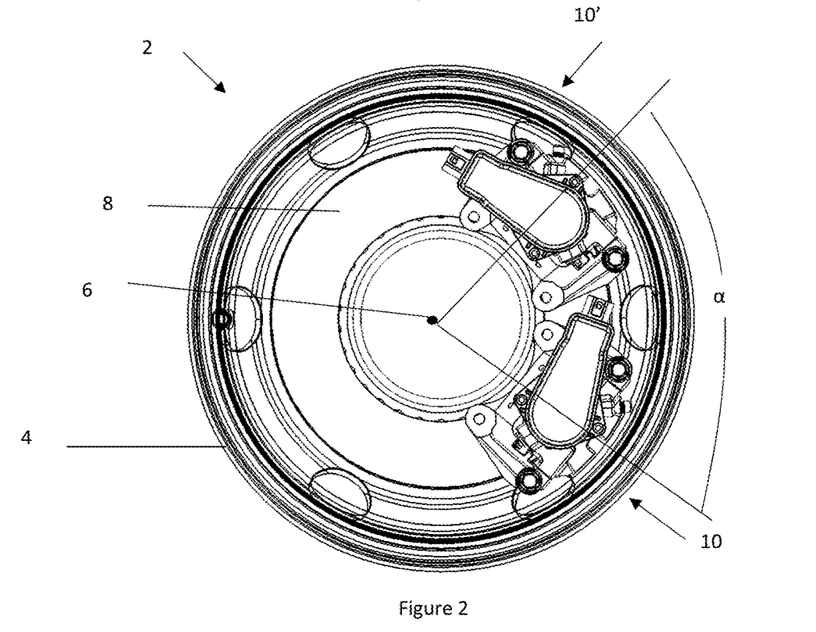
FIG. 2 is a top plan view of the brake system of FIG. 1.

FIG. 2 is a side plan view of the brake system 2 with two brake assemblies 10, 10' (as shown are fixed calipers) located within a rim 4 and located apart by an angle (α). The rim 4 and rotor 16 include an axis of rotation 6.

Figure 3A:
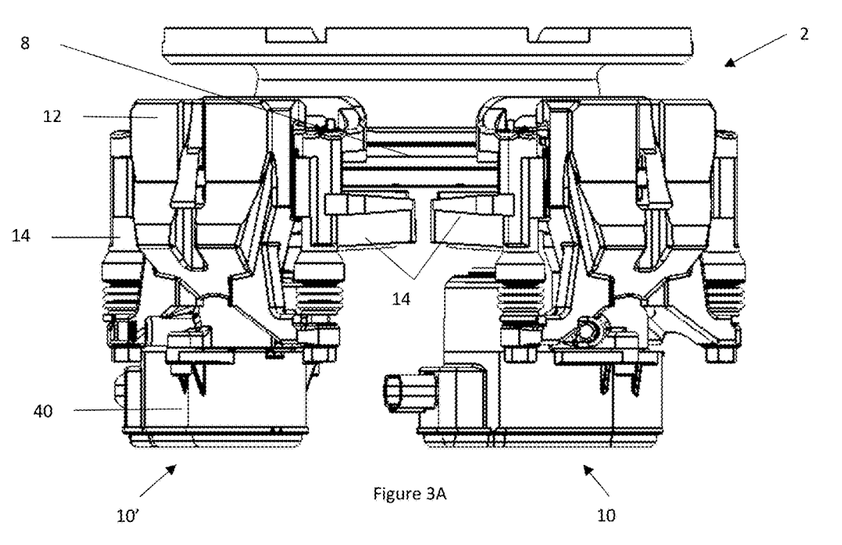
FIG. 3A is a top view of a brake system with the rim removed.

FIG. 3A is a top plan view of the brake system 2 showing two brake assemblies 10, 10' connected to a rotor 16. Each brake assembly 10, 10' includes a caliper 12, support bracket 14, and motor gear unit 40 that moves the caliper 12 relative to the support bracket 14 to create a braking force.

Figure 3B:
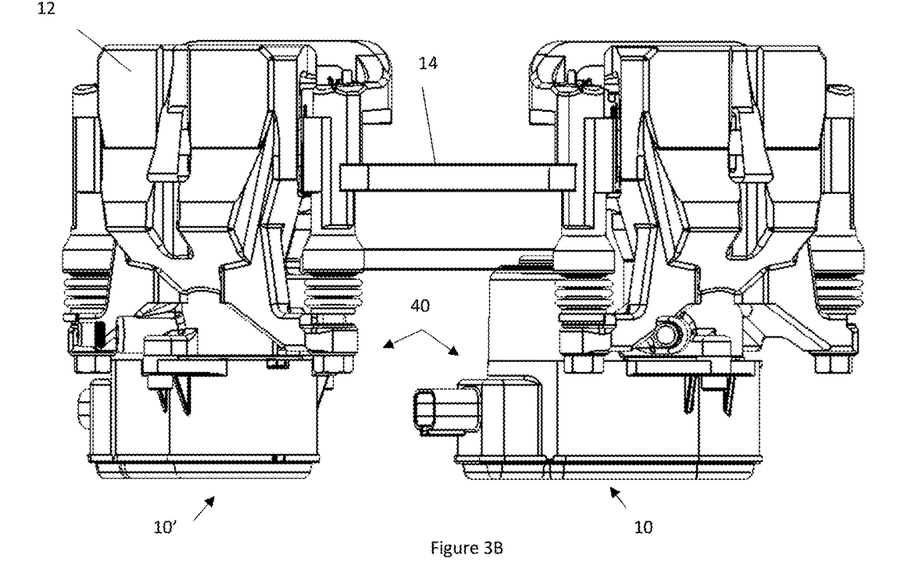
FIG. 3B is a top view of two brake assemblies carried on a common support bracket.

FIG. 3B is a top view of two brake assemblies 10, 10' connected to a single support bracket 14. Each brake assembly 10, 10' includes a separate caliper 12 and a separate motor gear unit 40 so that each brake assembly 10, 10' are movable independently.

Figure 4:
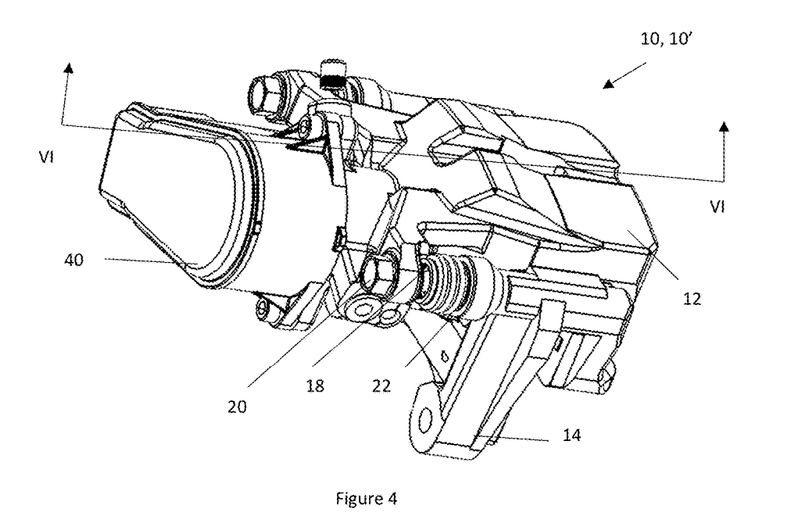
FIG. 4 is a perspective view of a brake assembly.

FIG. 4 is a perspective view of a brake assembly 10, 10'. The brake assembly 10, 10' includes a support bracket 14 that is connected to a caliper 12 via guide pins 18 and bolts 20. A boot 22 is located between the guide pins 18 and bolts 20. The caliper 12 is movable along the guide pins 18 so that the caliper 12 moves relative to the support bracket 14. A motor gear unit 40 is connected to the caliper 12.

Figure 5:
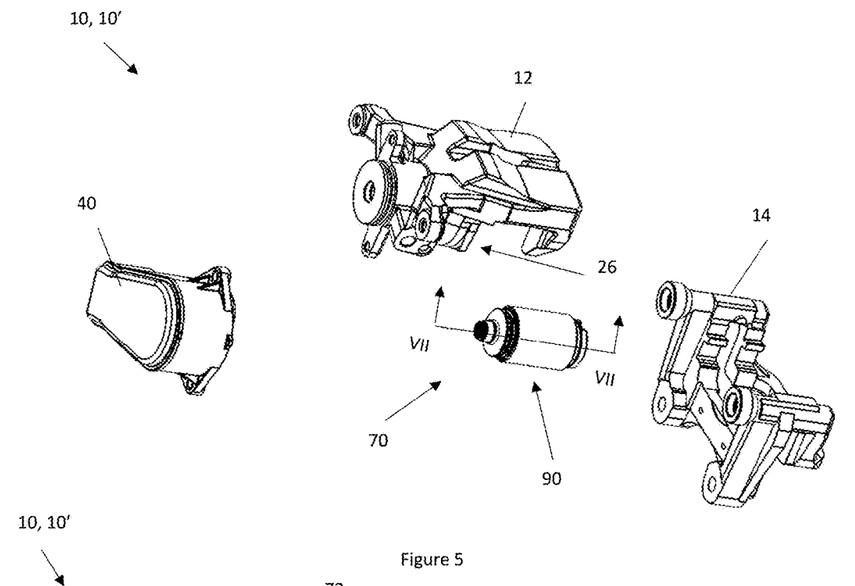
FIG. 5. is a partially exploded view of a brake assembly.

FIG. 5 is an exploded view of the brake assembly 10, 10'. As shown, the main components of the brake assembly 10, 10' are the caliper 12, support bracket 14, motor gear unit 40, and piston assembly 70. The piston assembly 70 is movable within a piston bore 26 within the caliper 12. The piston assembly 70 includes a rotary to linear actuator 90.

Figure 6:
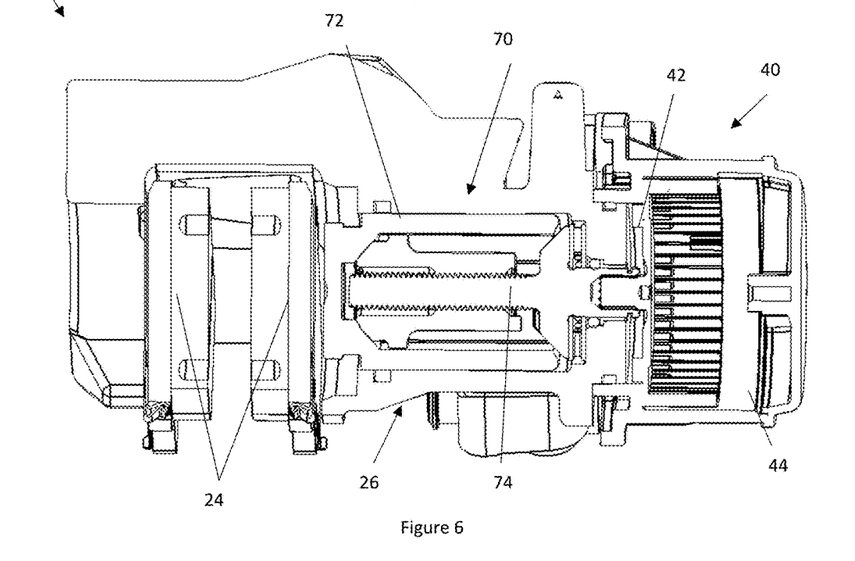
FIG. 6 is a cross-sectional view of the brake assembly of FIG. 4 along line VI-VI.

FIG. 6 is a cross-sectional view of the brake assembly 10, 10' of FIG. 4 along lines VI-VI. As shown, the motor gear unit 40 is connected to a piston assembly 70. The motor gear unit 40 includes a gear assembly 42 that converts torque from the motor 44 and transfers the torque to the spindle 74. The motor gear unit 40 rotates the spindle 74 so that as the spindle 75 rotates the piston 72 is axially moved into contact with brake pads 24. The brake pads 24 contact the rotor (not shown) to create a braking force.

Figure 7:
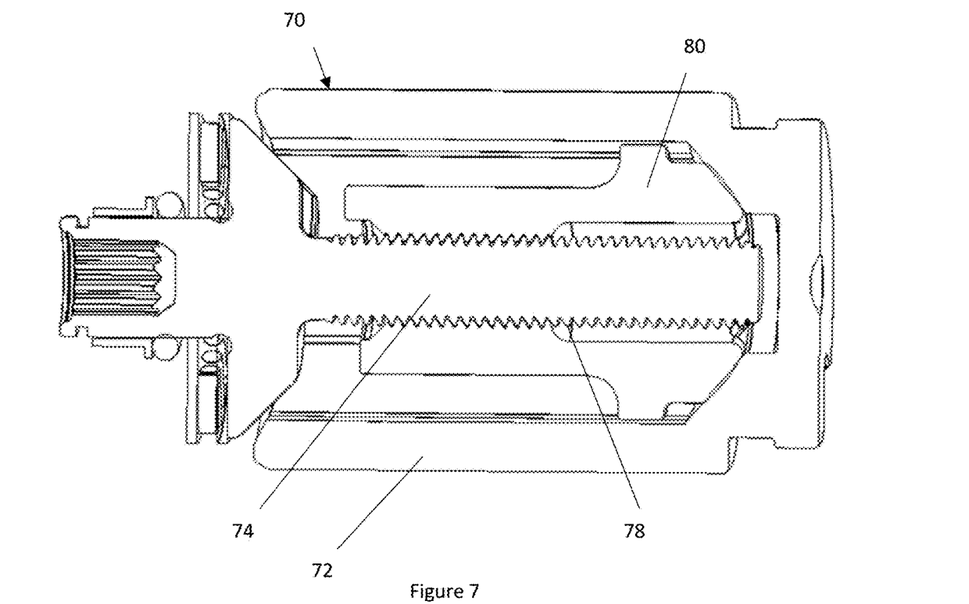
FIG. 7 is a cross-sectional view of a piston assembly of FIG. 5 along line VII-VII.

FIG. 7 is a close-up cross-sectional view of the piston assembly 70 of FIG. 5 cut along line VII-VII. The piston assembly 70 includes a spindle 74 including a plurality of threads 78 that are in contact with a plurality of threads 78 on the piston 72 or a nut 80 and as the spindle 74 rotates the piston 72 is axially moved.

Figure 8:
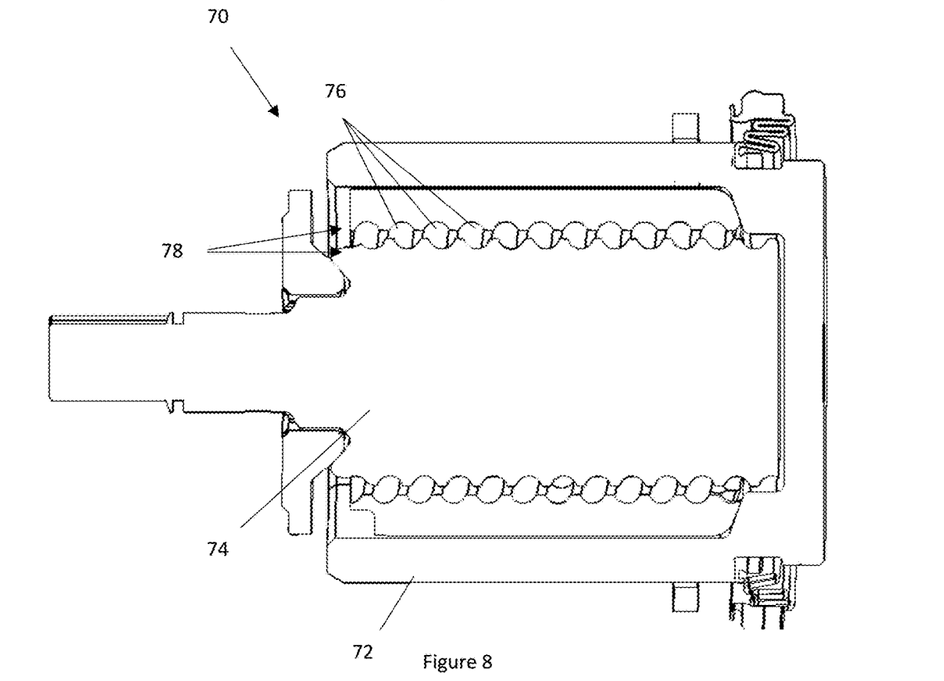
FIG. 8 is a cross-sectional view of a piston assembly.

FIG. 8 is a close-up cross-sectional view of a piston assembly 70. The piston assembly 70 includes piston 70 including threads 78, a spindle 74 including threads 78, and a plurality or rolling elements 76 located therebetween. When the spindle 74 is rotated the piston 72 is axially moved to create or release a brake apply.

Figure 9:
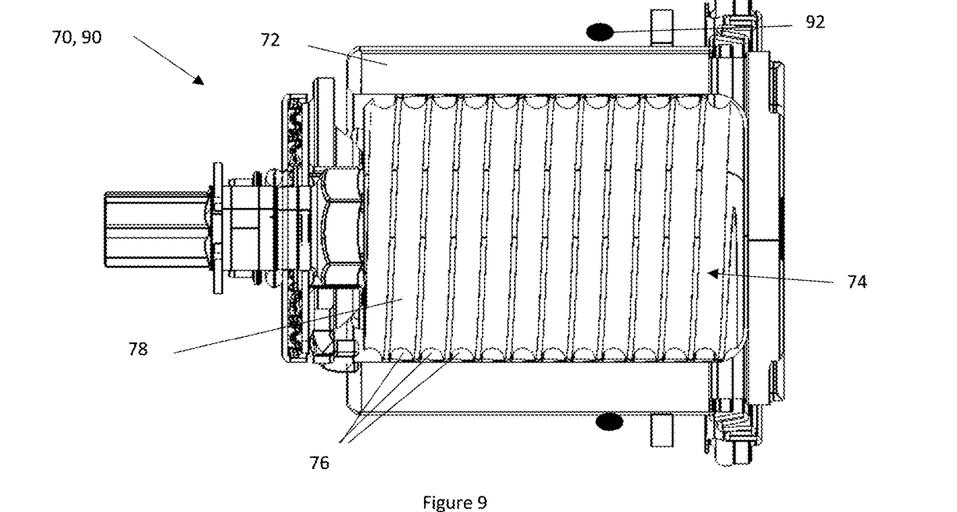
FIG. 9 is a top view of a piston assembly with a portion of the piston cut away.

FIG. 9 is a top view of a piston assembly 70 with a portion of the piston 72 cut away. The piston assembly 70 includes a rotary to linear actuator 90 which includes a piston 72 that axially movable by the spindle 74. The spindle 74 and piston 72 include threads 78 that are separated by rolling elements 76 so that rotation of the spindle 74 rotationally moves the piston 72. An anti-rotation device 92 extends around an outside of the piston 72.

Figure 10:
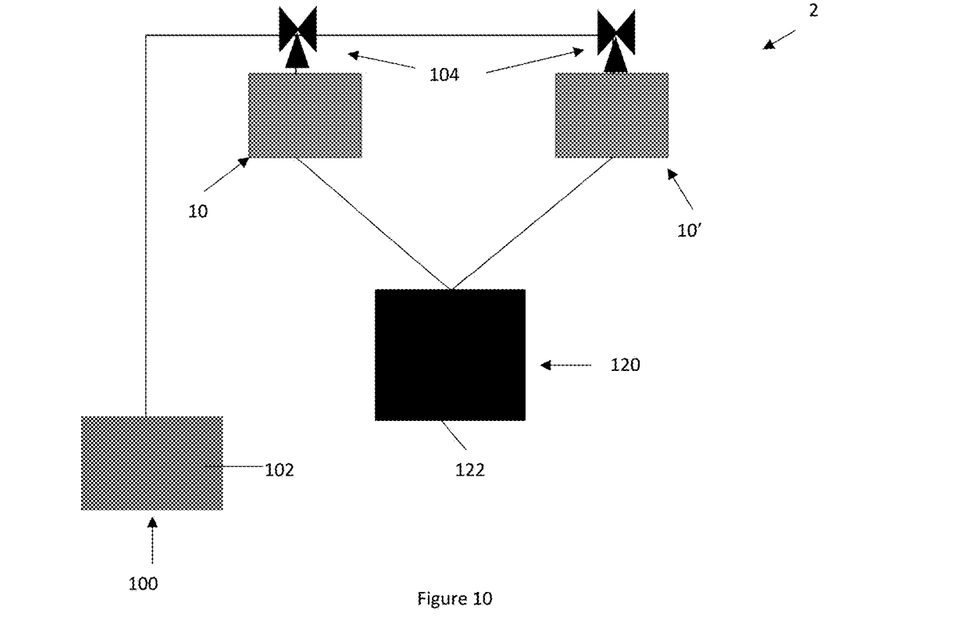
FIG. 10 is a schematic view of a brake system.

FIG. 10 illustrates a schematic view of a brake system 2. The brake system includes two brake assemblies (10, 10'). Each of the brake assemblies (10, 10') are connected to a hydraulic system 100 and a control system 120. The hydraulic system 100 includes a hydraulic unit that provides hydraulic fluid to one or both of the brake assemblies (10, 10'). The amount of hydraulic fluid may be controlled by a valve 104 located between the hydraulic unit 102 and each of the brake assemblies (10, 10'). The control system 120 includes a control unit 122 that provides electric signals to each of the brake assemblies (10, 10') so that each brake assembly can be actuated separately or together.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

We claim:

1. A brake system comprising:
   a. a rotor; and
   b. two or more brake assemblies in communication with the rotor, the two or more brake assemblies each including:
      i. a caliper;
      ii. a piston assembly located within the caliper; and
      iii. a motor gear unit in communication with the caliper and configured to move the piston assembly to create a braking force;
   wherein one or both of the piston assemblies are moved during a service brake apply or release;
   wherein one or both of the piston assemblies are moved during a parking brake apply or release; and
   wherein a controller powers a first and a second of the two or more brake assemblies and the controller powers both the first and the second of the two or more brake assemblies until brake pads of the two or more brake assemblies contact a rotor and then the controller alternates power between the first and the second of the two or more brake assemblies.

2. The brake system of claim 1, wherein a first of the two or more brake assemblies are moved during the service brake apply or release and a second of the two or more brake assemblies are moved during the parking brake apply or release.

3. The brake system of claim 1, wherein a first of the two or more brake assemblies alternate being applied during the service brake apply or released during the service brake release.

4. The brake system of claim 1, wherein all of the two or more brake assemblies are moved during both the service brake apply or release and the parking brake apply or release.

5. The brake system of claim 1, wherein during the service brake apply the two or more brake assemblies are moved by hydraulic pressure and the motor gear unit is off or in a neutral state.

6. The brake assembly of claim 1, wherein the two or more brake assemblies are identical.

7. The brake system of claim 1, wherein the piston assembly includes a rotary to linear actuator having a spindle with threads that are in communication with threads of a nut or a piston and rotational movement of the spindle axially moves the nut, the piston, or both.

8. The brake system of claim 1, wherein the piston assembly includes a rotary to linear actuator having a spindle with threads and a nut or piston with threads and rolling elements are located in the threads so that rotational movement of the spindle moves the nut, the piston, or both.

9. A brake system comprising:
   a. a rotor; and
   b. two or more brake assemblies in communication with the rotor, the two or more brake assemblies each including:
      i. a caliper;
      ii. a piston assembly located within the caliper; and iii. a motor gear unit in communication with the caliper and configured to move the piston assembly to create a braking force;

wherein one or both of the piston assemblies are moved during a service brake apply or release;

wherein one or both of the piston assemblies are moved during a parking brake apply or release; and wherein a controller controls movement of the two or more brake assemblies so that the braking force created by all of the two or more brake assemblies are substantially a same force.

10. The brake system of claim 1, wherein the two or more brake assemblies are two brake assemblies and the two or more brake assemblies are located on the rotor about 25 degrees apart or more and about 180 degrees or less.

11. The brake system of claim 6, wherein the motor gear units move a first and a second of the two or more brake assemblies during the parking brake apply or release.

12. A method comprising:
   a. supplying a signal to both a first brake assembly and a second brake assembly simultaneously;
   b. alternating the signal between the first brake assembly and the second brake assembly once contact between the first brake assembly and a rotor or the second brake assembly and the rotor is detected; and
   c. applying the first brake assembly and the second brake assembly until a predetermined braking force is generated.

13. The method of claim 12, wherein the first brake assembly and the second brake assembly each include a motor gear unit and a piston assembly, and the motor gear unit moves the piston assembly until the predetermined braking force is generated.

14. The method of claim 12, wherein a hydraulic fluid is applied to the first brake assembly and the second brake assembly and the method includes a step of turning the signal off.

15. The method of claim 12, wherein the first brake assembly and the second brake assembly are reclamped after a predetermined condition is met.

16. The method of claim 15, wherein the predetermined condition is an amount of time.

17. The method of claim 12, wherein during a hydraulic brake apply a valve turns off hydraulic pressure to the first brake assembly or the second brake assembly.

18. The brake system of claim 6, wherein a first of the two or more brake assemblies are moved during the service brake apply or release and a second of the two or more brake assemblies are moved during the parking brake apply or release.

19. The brake system of claim 6, wherein the piston assembly includes a rotary to linear actuator having a spindle with threads that are in communication with threads of a nut or a piston and rotational movement of the spindle axially moves the nut, the piston, or both.

20. The brake system of claim 6, wherein the piston assembly includes a rotary to linear actuator having a spindle with threads and a nut or piston with threads and rolling elements are located in the threads so that rotational movement of the spindle moves the nut, the piston, or both.

* * * * *